Oct. 6, 1936.     C. EHRENSPERGER     2,056,655
ELECTRIC CURRENT INTERCHANGE SYSTEM
Filed April 5, 1933     2 Sheets-Sheet 2

Fig. 2

Patented Oct. 6, 1936

2,056,655

UNITED STATES PATENT OFFICE 2,056,655

ELECTRIC CURRENT INTERCHANGE SYSTEM

Charles Ehrensperger, Baden, Switzerland, assignor to Aktiengesellschaft Brown Boveri & Cie., Baden, Switzerland, a joint-stock company of Switzerland Application April 5, 1933, Serial No. 664,531
In Germany May 7, 1932

22 Claims. (Cl. 175—363)

This invention relates to improvements in electric current rectifying systems employing an electron discharge device and more particularly to control means for permitting operation of the device alternately as an alternating current rectifier or as a direct current inverter.

It is well known to supply a direct current distribution line from an alternating current supply line through means employing an electron discharge device controlled for operation as an alternating current rectifier. It is frequently desired also to permit the transfer, to the alternating current line in a system such as above indicated, of energy produced by generators connected with the distribution line when such energy is in excess of the amount which can be utilized by current consuming devices connected with the distribution line. Such production of excess energy is frequent in systems, in which a direct current line supplies the motors of electric vehicles, when the motors of a vehicle operate as generators for regenerative braking thereof and therefore return energy to the line in excess of the amount required for the operation of other vehicles supplied from the same line. Such return of energy to the alternating current line is not possible through an ordinary rectifying system using an electron discharge device unless the polarity of the direct current line be first reversed which is impractical when a plurality of devices are supplied therefrom. By providing means for reversing the connections of the electron discharge device with the direct current line and for simultaneously adjusting the control means of the device in response to line conditions, the system may operate to return energy to the alternating current line without reversing the polarity of the direct current line.

The transfer of energy between the two lines may be controlled so as to automatically maintain the current flowing through the device at a predetermined intensity or so as to maintain the voltage of the direct current line at a value depending on the method of adjustment of the control means of the system. The control means are preferably so adjusted that the connections are reversed only when the current is at a minimum value to avoid current surges and to reduce the wear on the circuit interrupting means. It will generally be desired to provide means for interrupting the flow of current upon occurrence of a short circuit or overload in the output circuit or of a backfire within the device; means should also be provided for putting the auxiliary equipment of the device in operative condition when such device is to function.

It is, therefore, among the objects of the present invention to provide a control system for a current converting system employing an electron discharge device in which such device may be made to operate either as an alternating current rectifier or as a direct current inverter.

Another object of the present invention is to provide a control system for a current converting system employing an electron discharge device in which such device is automatically connected to operate as an alternating current rectifier or as a direct current inverter in response to the relative conditions in the alternating current line and in the direct current line.

Another object of the present invention is to provide a control system for a current converting system employing an electron discharge device in which such device is connected to operate as an alternating current rectifier or as a direct current inverter without reversing the polarity of the direct current line.

Another object of the present invention is to provide a control system for a rectifying-inverting system employing an electron discharge device in which the reversal of the direction of flow of current is obtained without producing excessive current surges.

Another object of the present invention is to provide a control system for a rectifying-inverting system employing an electron discharge device in which the flow of current through the device is automatically controlled so as not to exceed a predetermined value in either condition of operation.

Another object of the present invention is to provide a control system for a rectifying-inverting system employing an electron discharge device in which the ratio of the values of the input and the output voltages is maintained at a predetermined value at all loads.

Another object of the present invention is to provide a control system for a rectifying-inverting system employing an electron discharge device in which the ratio of the values of the input and the output voltages is different during rectifying and during inverting operation.

Another object of the present invention is to provide a control system for a rectifying-inverting system employing an electron discharge device in which the flow of current automatically reverses when the ratio of the values of the input and of the output voltages reaches a predetermined value.

Another object of the present invention is to provide a control system for a rectifying-inverting system employing an electron discharge device in which the flow of current automatically reverses when the current decreases below a predetermined value.

Objects and advantages other than those above set forth will be apparent from the following description when read in connection with the drawings in which.

Referring more particularly to the drawings by characters of reference, reference numeral 6 designates an alternating current supply line of any desired voltage, frequency and number of phases herein represented as a three phase line only for the reason that such type of line is most frequently utilized in practice. It is assumed that it is desired to obtain an exchange of energy between line 6 and a direct current output line having a positive conductor 7 and a negative conductor 8. To simplify the explanation of the embodiments hereinafter described, it will be assumed that the voltage of line 6 is invariably maintained at a constant value. Such constant voltage permits consideration of the value of the direct current voltage as being the quantity to be controlled instead of requiring consideration of the ratio of the alternating current voltage to the direct current voltage. It will be understood, however, that the system will function in a manner similar to that described when the alternating current voltage of line 6 is not constant.

The transfer of energy is effected through a suitable electron discharge device 9 provided with a plurality of anodes 11 each having the operation thereof controlled by the energization of an associated control electrode 12. Device 9 is provided with a suitable cathode 13 and with the usual ignition means (not shown) and with excitation anodes 14. In the embodiment illustrated in Fig. 1, device 9 is connected with line 6 over a disconnecting switch 16, a circuit breaker 17 and a transformer having a primary winding 18 and a star-connected secondary winding 19. Device 9 is also connected with line conductor 7 over a shunt 21 connected with cathode 13, a ripple smoothing reactor 22, a double pole reversing switch 23 by which the device may be connected with conductor 8, and a circuit breaker 24. The anodes 11 of device 9 are severally connected with the terminals of winding 19, which is here assumed to be of the double six phase type, while the neutral point of winding 19 is connected with conductor 7 or conductor 8 by means of reversing switch 23.

Figures 1, 3:
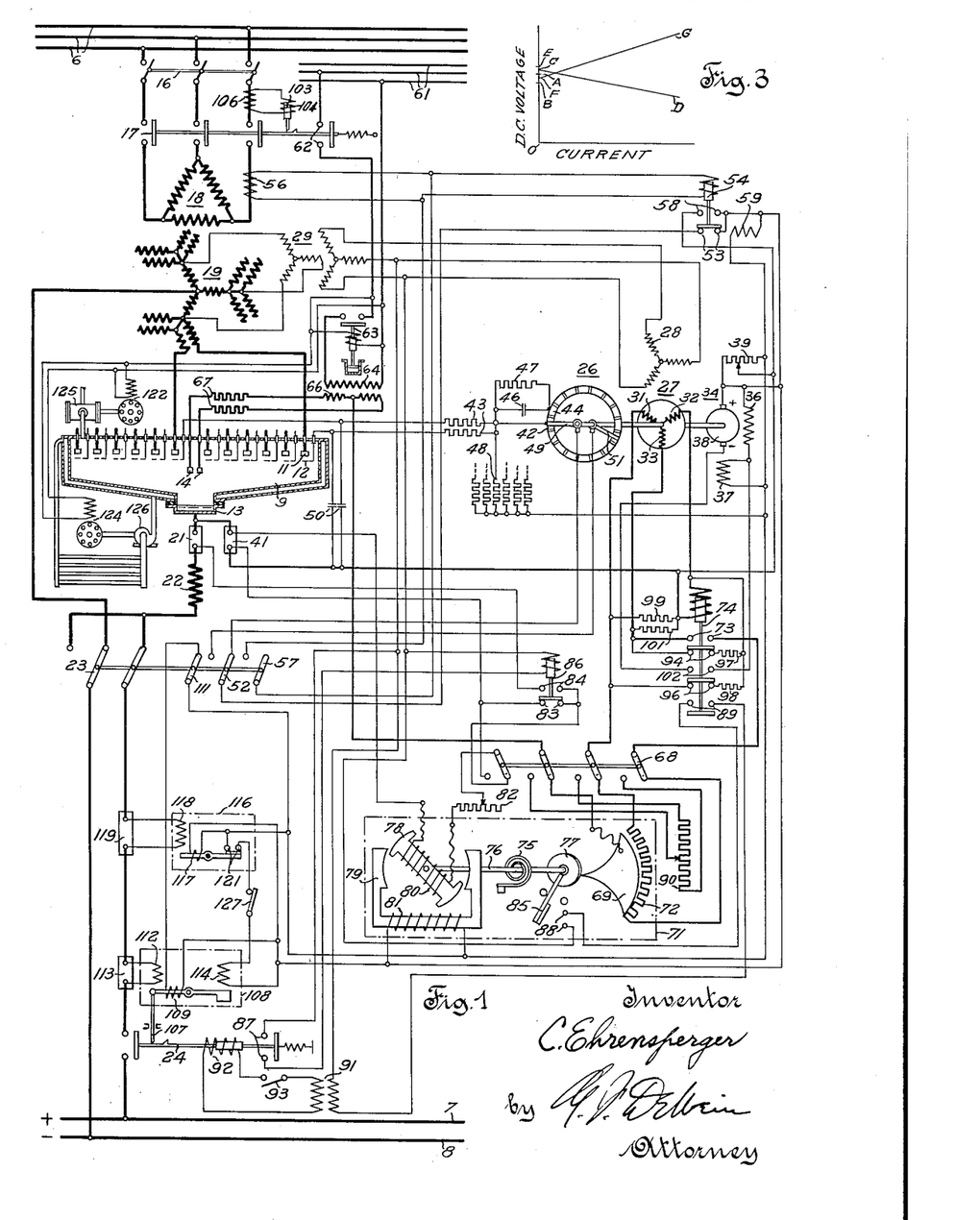
Fig. 1 diagrammatically illustrates one embodiment of the present invention in which a six phase electron discharge device may be manually so connected as to function either as an alternating current rectifier or as a direct current inverter, and in which the flow of current is automatically controlled so as not to exceed a predetermined value.
Fig. 3 is a diagram of the direct current input or output voltages of the system illustrated in Fig. 2, plotted against the values of the direct current.

The energization of the control electrodes of device 9 is effected by means of a distributor 26 having the brushes thereof driven by a synchronous motor 27. The stator winding 28 of motor 27 is energized from transformer winding 19 over a suitable transformer 29. The rotor or field windings 31, 32 and 33 of motor 27 are energized as will appear hereinafter. Motor 27 may also be used for driving a direct current generator 34 having an armature 36, a shunt field winding 36 and a series field winding 37. The potentials at the terminals of generator 34 are maintained in definite relation with respect to the potential of cathode 13 by connecting, across the output terminals of generator 34, a voltage divider 39 having an adjustable tap connected with cathode 13. Such connection is made by means of a shunt 41 of relatively high resistance, the purpose of which will appear hereinafter. Distributor 26 comprises a plurality of identical segments equal in number to twice the number of the phases of winding 19. Alternate segments as at 42 are each connected with two control electrodes associated with two anodes energized in phase coincidence with each other, such energization being applied over suitable current limiting resistances 43. Each of the remaining segments as at 44 is connected with the preceding segment 42 over a condenser 46 whereby segments such as 44 serve to avoid sparking when the flow of control current through the preceding segment 42 is interrupted by movement of the brush. A resistance 47 discharges the associated condenser 46 between passages of the brush over the associated segment. Each segment 42 is connected with the negative terminal of voltage divider 39 over a resistance as at 48 so as to generally maintain the associated control electrodes at a negative potential with respect to the potential of cathode 13. Condensers 50 are connected between each control electrode and cathode 13 to bypass any voltage surges which would tend to disturb the normal operation of the control electrodes. Distributor 26 is preferably provided with two brushes, of which brush 49 is used during the operation of device 9 as a rectifier and brush 51 is used during the operation of device 9 as an inverter. As is well known, the energization of control electrodes 12 must occur at different parts of the voltage wave of line 6 for the rectifying and for the inverting operations, and by using for such operations two spatially displaced brushes the control of synchronous motor 27 may be effected in substantially the same manner during rectifying and inverting operations. Either brush 49 or 51 is connected with the positive terminal of voltage divider 39 over auxiliary switch 52 controlled by switch 23 and over contact 53 of an overload relay 54. The coil of relay 54 is energized from a current transformer 56 inserted in the connection of transformer winding 18 with line 6; the secondary winding of current transformer 56 being short circuited during inverting operation of the system by an auxiliary switch 57 controlled by switch 23.

Upon occurrence of a short circuit in the output circuit or of a backfire in device 9, relay 54 interrupts the connection of brush 49 or 51 so that all control electrodes 12 are only negatively energized with respect to cathode 13 from voltage divider 39. Relay 54 then closes contact 58 short circuiting the positive portion of voltage divider 39 so that the negative portion of such voltage divider receives the entire output voltage of generator 34 and therefore makes control electrodes 12 more negative than during normal operation. Contact 53 may be provided with a blow-out coil 59 energized from voltage divider 39.

Windings 31, 32, 33 are energized from the excitation circuit of device 9 which may receive current from line 6 or, as is more generally the case, from an auxiliary supply line such as line 61. Such connection is controlled by contacts 62 of circuit breaker 17 and is made upon closure of a time delay relay 63 energized from line 61 upon closure of contact 62. The contacts of relay 63 close the circuit of the primary winding 64 of an ignition and excitation transformer having a secondary winding 66 provided with a midtap. Winding 66 energizes the ignition means (not shown) of device 9 and energizes the excitation anodes 14 thereof over current limiting resistances 67.

The midtap of winding 66 is connected with one blade of a four pole double throw switch 68 by which the system may be connected either for automatic or for manual control of the current intensity through device 9. The automatic control of the current intensity is obtained by means of a regulator 71 provided with a regulating resistance 72. A conductive sector 69 is in contact with an arcuate contact path (not shown) consisting of a plurality of conductive segments separated by insulation, each segment being connected with an intermediate point of resistance 72. To simplify the drawing, sector 69 is illustrated as directly contacting with resistance 72 to provide a movable tap thereon. One terminal of resistance 72 may be connected over switch 68 with winding 31 of motor 27 and the other terminal of such resistance may be connected with winding 33 over switch 68 and over contacts 73 of a starting relay 74. Winding 32 is connected in series with the coil of relay 74 which is connected with cathode 13 over shunt 41. Regulator 71 is actuated by a driving mechanism comprising a field core 79 provided with a winding 81 and a movable armature core 78 provided with a winding 80 and mounted on a spindle 76. Spindle 76 is provided with a hub 77 serving as a fulcrum for sector 69 and with a spring 75 opposing the torque produced by the driving mechanism. Spindle 76 also carries a contact arm 85 operable to close a pair of contacts 88 and which may engage with suitable stops to limit the movement of spindle 76. Winding 81 is energized at a constant voltage from voltage divider 39 and winding 80 is energized over suitable flexible leads from shunt 21 or from shunt 41, such connection being completed by way of regulating rheostat 82, one blade of switch 68, and contacts 83 or 84 of a low voltage relay 86. The coil of relay 86 is energized from the secondary winding of transformer 29 over contacts 87 provided on circuit breaker 24 and which are closed when such circuit breaker is in the closed position. Contacts 88 are connected in series with a pair of contacts 89 of relay 74 in the circuit of a transformer 91 which serves to energize the closing coil 92 of circuit breaker 24. Such energization may also be controlled by means of a hand operated switch 93.

When a manual control of the flow of current is desired, switch 68 is moved from the position shown into the reverse position, whereby resistance 72 is disconnected and is replaced by resistance 90 which is provided with a hand operated movable tap. Relay 74 is provided with contacts 94 and 96 which permit the flow of current through windings 31, 32 and 33 over resistances 97 and 98 when the coil of relay 74 is deenergized. Resistances 99 and 101 are connected in parallel with windings 31, 32, and 33 and with the coil of relay 74 to reduce the inductive surge voltage appearing at the terminals of windings 31, 32 and 33 upon interruption of the flow of current therethrough. Another pair of contacts 102 of relay 74 permit the armature 38 of generator 34 to excite the field 36 thereof upon closure of such contacts.

Circuit breaker 17 is provided with a latch 103 which may be released by means of a trip coil 104 energized from a current transformer 106. Circuit breaker 24 is provided with a latch 107 which may be released by means of a polarized relay 108 having a polarized coil 109 energized from voltage divider 39 over a switch 111 controlled from switch 23. Relay 108 releases latch 107 upon flow of excessive current from switch 23 to conductor 7 through a shunt 113 energizing the coil 112 of the relay. A voltage coil 114 of relay 108 is normally energized from voltage divider 39 and causes such relay to release latch 107 upon deenergization of coil 114. A second polarized relay 116 opens a pair of contacts 121 in circuit with coil 114 upon reverse flow of excessive current or current flow from conductor 7 towards reversing switch 23. For this purpose, relay 116 is provided with a polarizing coil 117 energized from voltage divider 39 and with an operating coil 118 energized from a shunt 119 inserted in the connection of switch 23 with line 7. Device 9 is provided with the usual auxiliary equipment such as a vacuum pump 125 driven by a motor 122 and with a water circulating pump 126 driven by a motor 124. Motors 122 and 124 are preferably energized from line 61 upon closure of contact 62.

The operation of the system will first be considered assuming that the system is connected as shown, that is, switch 23 moved into the position shown to permit operation of device 9 as an alternating current rectifier transferring energy from line 6 towards line 7, 8. Under such conditions switch 93 may be closed, but such closure is without immediate effect as contacts 88 and 89 are open and, in addition, transformer 29 is not energized. Disconnecting switch 16 is then closed and circuit breaker 17 is likewise closed by any suitable means. Circuit breaker 17 therefore closes its contact 62, thereby energizing motors 122 and 124 from line 61, and pumps 125 and 126 operate to maintain device 9 in the proper operating conditions of vacuum and temperature. The coil of time delay relay 63 is likewise energized, but the time delay device of such relay prevents the immediate closure of the contacts thereof. Upon closure of circuit breaker 17, winding 18 is energized from line 6 and induces voltages in winding 19 from which transformer 29 is energized. Winding 28 then receiving current from transformer 29, motor 27 starts as an induction motor, windings 31, 32 and 33 then receiving currents induced by magnetic induction from winding 28 and flowing over contacts 94 and 96 of relay 74 and over resistances 97 and 98. Under such conditions, motor 27 reaches a speed which closely approaches the normal operating or synchronous speed thereof. Relay 63, then closing the contacts thereof, energizes transformer 64, 66 and the arc in device 9 is ignited by the usual means (not shown) energized from winding 66. An excitation current is then initiated in device 9 and flows from winding 66 over resistances 67, excitation anodes 14, cathode 13, shunt 41, coil of relay 74, winding 32, winding 31, resistance 72, sector 69, switch 68 back to winding 66. The coil of relay 74 being energized, the armature thereof is attracted and closes contacts 73 so that current may also flow from winding 32 over winding 33, contacts 73, switch 68 to resistance 72. Such current is a pulsating direct current which is maintained at a substantially uniform value by the large inductance of windings 31, 32 and 33, so that the arc is maintained between anodes 14 and cathode 13 without extinguishing between successive half cycles. The field windings of motor 27 thus receiving substantially uniform direct current, motor 27 operates in synchronism with the voltage of line 6.

Relay 74 having operated, contact 89 is closed but such closure is without effect as contacts 88 in series therewith are still open. Contacts 102 having closed, generator 34 excites itself as armature 38 is connected with field winding 36. Shunt 41 is selected with a resistance such that the voltage drop due to the flow of excitation current through such shunt is higher than the voltage drop produced in shunt 21 by current of any normal value. A relatively large control current therefore flows from shunt 41 to armature winding 80 of regulator 71 and returns over regulating rheostat 82, switch 68 and contacts 83 to shunt 41. The flow of such current causes armature 78 to rotate and thereby move sector 69 into the extreme position opposite to that shown in the drawings. The excitation current of device 9 therefore then flows almost entirely through winding 31 and is almost entirely withdrawn from winding 33. The position of the rotor of motor 27 is therefore retarded to the maximum extent with respect to the rotating field produced in the stator by winding 28 and brush 49 connects each control electrode 12 with the positive terminal of voltage divider 39 towards the end of the positive half cycle of the associated anode. The reversal of spindle 76 causes contacts 88 to be bridged by member 85 so that transformer 91 is excited from the secondary winding of transformer 29 and energizes closing coil 92 of switch 24. Switch 24 then closes, thereby closing contacts 87 and also maintaining itself in closed position by latch 107. The connection between line 6 and line 7, 8 is now completed so that current may flow therebetween. The coil of relay 86 is energized from the secondary winding of transformer 29 over contacts 87, and relay 86 opens contacts 83 and closes contacts 84. Armature winding 80 of regulator 71 is then energized in response to the load current flowing through device 9 by means of shunt 21. Switch 93 may then be reopened to permit circuit breaker 24 to open when released by movement of latch 107.

The system then being in fully operative condition, control electrodes 12 are generally maintained negative with respect to cathode 13 from voltage divider 39 over resistances 48 and 43. The anodes of device 9 are energized in pairs and sequentially become positive with respect to cathode 13. During such period of positive energization of the anodes, the control electrodes associated with one such pair of anodes become positively energized from voltage divider 39 over contact 53 of relay 54, switch 52, brush 49, contact 42 and resistance 43, and therefore permit the associated anodes to carry current until such anodes are no longer positive with respect to cathode 13. Such process is repeated sequentially for each pair of anodes and control electrodes during each cycle of the voltage of line 6 to cause the flow of a direct current from cathode 13 to line 7, 8. If the voltage of line 7, 8 is maintained at a comparatively high value by means of direct current generators or by current converters other than that shown in the drawings, the current flowing through device 9 will be at values below the value to which such current is to be limited by regulator 71. The voltage drop in shunt 21 is then at a low value and spring 75 causes regulator 71 to return to the position shown in the drawings. The excitation current of device 9 then flows almost entirely through winding 33 to the exclusion of winding 31 so that the rotor of motor 27 advances to the maximum extent with respect to the rotating field produced by windings 28. Brush 49 then causes positive energization of each control electrode at the earliest moment of the voltage cycle of line 6 at which the associated anode may carry current. The control electrodes are therefore without effect in delaying the discharge and device 9 delivers the maximum amount of current consistent with the value of the voltage in line 7, 8. If the voltage in line 7, 8 increases, the current may tend to increase to values higher than the desired limit value. The current flowing through armature winding 80 of regulator 71 then increases and causes the torque of armature 78 to overcome the action of spring 75 and thereby causes spindle 76 to rotate and to bring sector 69 into contact with an intermediate point of resistance 72. The excitation current of device 9 is then flowing in variable proportions through windings 31 and 33 so that the rotor of motor 27 lags by a certain amount behind the rotating field created in winding 28. The energization of the control electrodes by brush 49 is retarded by a certain extent, thereby causing each anode of device 9 to carry current at a later part of the voltage cycle of line 6. Such movement of regulator 71 is continued until the flow of current through the anodes of device 9 during each cycle is sufficiently retarded to cause such current to be reduced to the desired maximum value. Such value may be adjusted at will by adjustment of rheostat 82 which controls the response of regulator 71 to the value of the voltage drop in shunt 21.

To stop the flow of current through device 9, rheostat 82 is preferably adjusted to cause regulator 71 to take the extreme position opposite to that illustrated and thereby to regulate the value of the load current to a minimum value. If it is desired to disconnect the system entirely, circuit breaker 17 may be opened, thereby making the entire system inoperative. If it is desired to interrupt the flow of current only momentarily, it is sufficient to open switch 127, whereupon circuit breaker 24 opens and interrupts the flow of current through device 9. Switch 24 also opens contact 87, the coil of relay 86 is deenergized and such relay again closes contacts 83; coil 80 of regulator 71 is again energized from shunt 41 thereby causing regulator 71 to be maintained in the extreme position opposite to that illustrated. If the flow of current is then to be reestablished, switch 93 is reclosed, thereby causing circuit breaker 24 to close and the system again operates as described above.

If it is desired to change over to manual control of the flow of current before switch 93 is reclosed, switch 68 is first reversed so as to cause the excitation current of device 9 to flow over resistance 90 instead of resistance 72 of regulator 71. Such reversal of switch 68 causes winding 80 of regulator 71 to be permanently connected with shunt 41 so that contacts 88 remain closed by member 85, thereby maintaining transformer 91 connected with transformer 29 which is energized. Switch 24 may then be reclosed by reclosure of switch 93, and the flow of current is then controlled by manual adjustment of the movable tap of resistance 90. If it is desired to start manual operation of the system when the latter is in entirely inoperative condition, the starting operation is similar to that described above except that switch 68 is first reversed whereby regulator 71 is maintained in the extreme position opposite to that shown upon starting of the excitation current in device 9, and remains in that position without regard to the position of relay 86.

Upon occurrence of an overload or of a short circuit in line 7, 8 or of a backfire in device 9, such disturbances causing increase of current to transformer 18, 19, relay 54 receives an increased current from current transformer 56 and immediately opens contact 53 and closes contact 58. Contact 53 being open, the control electrodes are constantly maintained at a negative potential with respect to cathode 13 and cause the arc in device 9 to cease to attach to the anodes thereof, thereby interrupting the flow of current through device 9. Closure of contact 58 short circuits the positive portion of voltage divider 39 so that the negative voltage impressed on control electrodes 12 is then the full voltage of generator 34. Simultaneously with the above, current transformer 106 supplies an increased current to trip coil 104 which lifts latch 103 and permits circuit breaker 17 to open. Opening of contacts 62 deenergizes transformer 64, 66 and the arc within device 9 is entirely extinguished. When the disturbance is a short circuit or an overload in line 7, 8, polarized relay 108 also lifts latch 107 which causes circuit breaker 24 to open. If the disturbance is a backfire within device 9 and if the conditons of line 7, 8 are not such that the line is capable of supplying a reverse current through device 9, no current will flow in the connections between device 9 and line 7, 8 and circuit breaker 24 will open only upon opening of circuit breaker 17 which causes coil 114 to become deenergized and thereby permits relay 108 to lift latch 107. If line, 7, 8 is excited from a direct current generator or from current converters other than the one illustrated, upon occurrence of a backfire in device 9, a current will flow from conductor 7 to cathode 13 over the backfiring anode and winding 19 to the negative conductor 8. Relay 116 then opens contacts 121 thereby causing coil 114 to be deenergized and permitting circuit breaker 24 to open. If the voltage of generator 34 fails for any reason, coil 114 is again deenergized and permits circuit breaker 24 to open. If the flow of excitation current through device 9 fails, relay 74 becomes deenergized, thereby opening the circuit of field 36 of generator 34. Under such condition circuit breaker 24 again opens as above described.

If, the system being connected as shown, it is desired to operate device 9 as a direct current inverter, switch 23 is first reversed to the position opposite to that illustrated. Switch 111 then opens, switch 57 closes and brush 51 is connected with voltage divider 39 over switch 52 which disconnects brush 49. By proper adjustment of brush 51 it is possible to obtain the flow of a predetermined amount of current through device 9 during either rectifying or inverting operation of such device for approximately the same position of regulator 71 and therefore approximately the same position of the rotor of motor 27 with respect to the rotating field of the stator thereof. When the system is adjusted to change over from rectifying to inverting operation, the current flowing between switch 23 and line 7, 8 is reversed but the current through device 9 and shunt 21 is not reversed so that, during inverting operation, regulator 71 regulates the flow of current exactly in the same manner as during rectifying operation. If device 9 is operating as a rectifier and it is desired to change over to the inverting operation, circuit breaker 24 is opened by opening switch 127 in the circuit of coil 114. Switch 23 may then be reversed and the system may then be put in inverting operation by closing circuit breaker 24 by means of switch 93.

During inverting operation, relay 54 must be made inoperative so as to permit positive energization of the control electrodes even during abnormal operation. If relay 54 were made operative, without other steps being taken, upon occurrence of an overload or of a short circuit in line 6 and upon operation of relay 54, the anode carrying current at such instant would continue alone to carry current as all the other anodes are then made inoperative by the action of their control electrodes. Such current carrying anode would then be severely overloaded and generally damaged by such overload. Relay 54 is made inoperative by short circuiting current transformer 56 by means of switch 57 which is controlled by switch 23. Upon occurrence of an overload in line 6, circuit breaker 17 then opens under the action of current transformer 106 on trip coil 104. Upon occurrence of either of the above conditions or of a backfire in device 9, the current supplied from line 7, 8 will be an increased current in the direction of the load current previously supplied thereby, which will cause relay 116 to open contacts 121 and thereby cause relay 108 to operate latch 107 whereupon circuit breaker 24 opens. Since, during inverting operation, the current in shunt 113 always flows in the direction which will not cause relay 108 to operate, polarizing coil 109 may be opened by switch 111. During either inverting or rectifying operation, if the voltage of line 6 becomes considerably lower than the normal value thereof, relay 86 opens contacts 84 and closes contacts 83 thereby causing regulator 71 to take the extreme position opposite to that illustrated and thereby to regulate the flow of current to the minimum value thereof. An excessive flow of current is thus avoided during inverting operation and, during rectifying operation, an excessive current surge is avoided upon recovery of the voltage in line 6.

Figure 2:
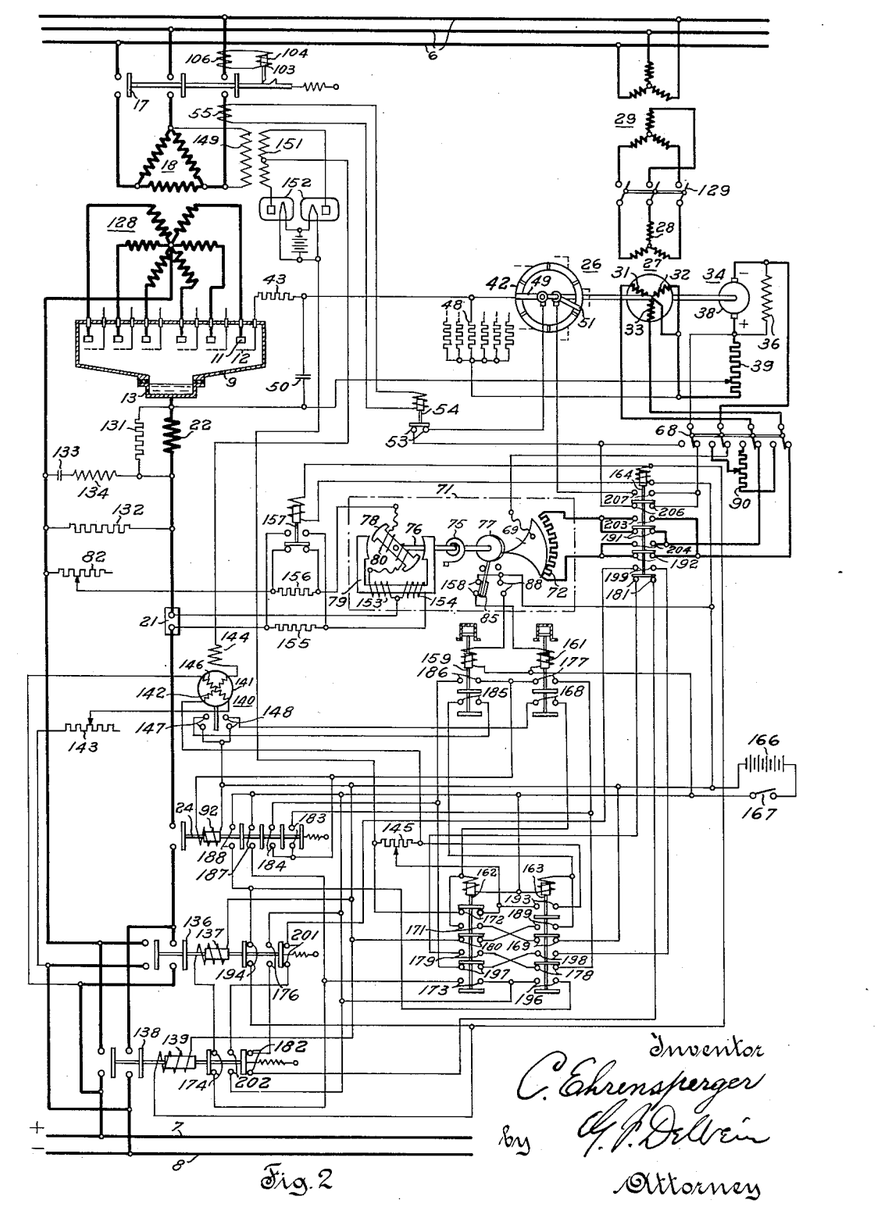
Fig. 2 diagrammatically illustrates another embodiment of the present invention in which a six phase electron discharge device is automatically so connected as to function either as an alternating current rectifier or as a direct current inverter, and in which the ratio of the values of the input and of the output voltages is maintained at values depending on the current intensity and differing for rectifying and for inverting operation.

In the embodiment illustrated in Fig. 2, the transformer associated with device 9 is assumed to have a single six phase secondary winding 128 and device 9 is accordingly provided with only six anodes and six control electrodes. The stator 28 of motor 27 is then connected as illustrated in Fig. 2, transformer 29 being supplied directly from line 6 and being connected with stator 28 over a switch 129. Reactor 22 is bridged by a resistance 131 and the direct current terminals of the system are bridged by a resistance 132, such resistances being for the purpose of diverting voltage surges occurring during the operation of the system. The voltage ripple in the direct current circuit is reduced by the combined action of reactor 22 and of a resonant filter tuned to the frequency of the ripple voltage and comprising a condenser 133 connected in series with a reactor 134. In the present embodiment, reversing switch 23 is omitted and the connections between device 9 and line 7, 8 are effected over a double pole circuit breaker 136 during rectifying operation and over a double pole circuit breaker 138 during inverting operation of the system. Circuit breakers 136 and 138 are arranged to be closed and to be maintained in the closed position by the energization of their closing coils 137 and 139. Only one of circuit breakers 136 and 138 may be closed at any instant and such breakers may be operated to close or to open only when circuit breaker 24 is open.

To make the system connections of device 9 automatically reversible in response to the variations of the voltage in line 7, 8, the voltages of line 7, 8 and of line 6 are compared by means of a relay 140. Such relay may have two separate coils each responsive to the voltage of one of the lines and arranged to exert a differential action on a common armature. It is, however, preferred to use a relay responsive to the ratio of the voltages of the two lines. Such a relay may be constructed with a field coil 144 connected in series with a movable armature coil 142 receiving current from one of the lines and with a second armature coil 146 mounted at right angles with coil 142 and receiving current from the other line. In such a relay, armature 141 will take a position depending on the ratio of the current intensities in coils 142 and 146. Coil 146 is energized in response to the voltage of line 7, 8 over a rheostat 143 which permits adjustment of the value of the ratio of voltages which will cause armature 141 to move in the one or in the other direction. Coils 144 and 142 are energized in response to the voltage of line 6 over a potential transformer having a primary winding 149 and a secondary winding 151. The current in coil 146 being direct current, it is necessary to energize coils 144 and 142 also with direct current and the current supplied by winding 151 is therefore rectified over a pair of current rectifying devices 152 of any suitable type, the connection of winding 144 then being made at a midtap of winding 151. As will appear hereinafter, a resistance 145 is inserted in series with coils 142 and 144 during rectifying operation and is short circuited during inverting operation to permit the operation of device 9 either as a rectifier or as an inverter at voltages having a common range rather than at voltages above or below a predetermined limit. Relay 140 is provided with a contact arm operable to close contacts 147 or 148 to change from one connection to the other dependent on the operation thereof.

In the present embodiment, winding 81 of regulator 71 is replaced by two windings of which winding 153 is connected in series with armature winding 80 and the other winding, 154, is energized from shunt 21 over a resistance 155. Regulator 71 is thus operable in response to the variations of the voltage in lines 7, 8 by means of windings 80 and 153, such action being modified in response to the flow of current in such line by means of winding 154. Such response is adjusted at different degrees during rectifying and inverting operations by means of a relay 157 having the coil thereof energized only during inverting operation. As an example of such action, during rectifying operation, relay 157 short circuits a resistance 156 in the circuit of coils 80 and 153 and, during inverting operation, such relay removes the short circuit from resistance 156 and instead short circuits resistance 155. Regulator 71 is provided, in addition to contacts 88, with contacts 158 which are closed when the regulator is in the position shown. Contacts 88 and 158 can be closed only when regulator 71 maintains a current flowing through device 9 at the lowest value which such regulator permits obtaining, and such contacts cooperate with contacts 147 and 148 to reverse the connections of device 9 only when the voltage of line 7, 8 is within a predetermined range of values and when the current flowing through device 9 is at the lowest value to which such current may be adjusted. Reversal of the connections of device 9 therefore occurs only at a suitable voltage and without causing excessive current surges. Contacts 88 and 158 control the energization of the coils of two time delay relays 159 and 161 respectively. Such relays cooperate with relay 140 in controlling the energization of the coils of two changeover relays 162 and 163 which control the operation of circuit breakers 24, 136 and 138. A regulator relay 164 provides the proper connection between resistance 72 and the rotor of motor 27 and also the connection of brushes 49 and 51 of distributor 26. The relay coils and the circuit breaker coils may be energized from any suitable source such as a battery 166, the circuit of which may be closed by means of a switch 167.

Assuming the system to be connected as shown and line 6 being energized, circuit breaker 17 is closed, thereby causing the anodes of device 9 to be energized so that such anodes begin to carry current upon suitable energization of the control electrodes associated therewith. Assuming that the voltage of line 7, 8 is at a low value, not exceeding the value represented by distance OA in Fig. 3, the current flowing through coil 142 of relay 140 over a portion of resistance 145 will be comparatively larger than the current flowing through coil 146 and such relay closes contacts 148. Assuming that switch 129 is closed, the stator 28 of motor 27 is energized from line 6 over transformer 29 and a sequence of operations will occur independently of any action of the relays of the system. Such sequence of operations will be considered first although it will be understood that such operations occur simultaneously with the operation of the relays to be described hereinafter. Upon energization of stator 28, motor 27 starts as an induction motor because winding 32 is short circuited and windings 31 and 33 have the circuit thereof completed over resistance 72, and the rotor reaches a speed approaching the synchronous speed thereof. Generator 34 then excites itself over the field winding 36 thereof and causes the flow of current over voltage divider 39 to windings 31 and 33 of motor 27, switch 68, contacts 192, resistance 72 and also to winding 31, switch 68, contacts 191 to resistance 72, such currents combining to flow over sector 69 and switch 68 back to generator 34. The flow of such currents in windings 31 and 33 causes motor 27 to run in synchronism with the voltage of line 6. Regulator 71 is then still in the position shown so that the greater portion of the current supplied to windings 31 and 33 flows over winding 33 and causes the rotor of motor 27 to advance to the maximum extent with respect to the rotating field produced by stator 28. The brushes of distributor 26 are therefore operable to energize the control electrodes of device 9 at the earliest possible time of the voltage cycle of line 6. Brush 49 is then positively energized with respect to cathode 13 from voltage divider 39 over switch 68, contacts 206 and contacts 53. As already described with respect to the embodiment illustrated in Fig. 1, device 9 will then be operable to supply direct current to line 7, 8 at the maximum voltage. Circuit breaker 24 being still open, device 9 does not supply current to line 7, 8 and only charges condenser 133 at a voltage equal to the peak value of the phase voltages of winding 128.

During the above sequence of operations, switch 167 being closed and contacts 148 and 158 being closed, a current flows from battery 166 over contacts 158, coil of relay 161 and switch 167 back to battery 166, thereby causing relay 161 to close contacts 169 and 177. A current then flows from source 166 over contacts 148, contact 168, coil of relay 162 and switch 167 back to battery 166. Relay 162 lifts the armature thereof, thereby closing contacts 171 and current then flows from battery 166 over contacts 169 and 171 through coil of relay 162 and switch 167 back to battery 166 so that the armature of relay 162 remains attracted even if contacts 148 and 168 open. Relay 162 having opened contacts 172, the entire resistance 145 is now in series with coils 142 and 144 of relay 140 causing such relay to be operable to reverse when the voltage of line 7, 8 exceeds a value represented by OB in Fig. 3. As explained above the output voltage of device 9 is maintained by condenser 133 at the peak value of the voltage of winding 128 and such voltage being impressed on windings 80 and 153 of regulator 71, the regulator reverses from the position shown into the opposite extreme position thereby opening contacts 158 and causing the coil of relay 161 to be deenergized. Regulator 71 having reversed, sector 69 energizes winding 31 to a much greater extent than winding 33 and the rotor of motor 27 then lags to the greatest possible extent with respect to the rotating field induced by winding 28. The output voltage of device 9 is then reduced to the minimum value thereof so that device 9 may be connected with line 7, 8 and, upon completion of such connection, the flow of current will begin at not over the lowest value to which such current may have been adjusted and, therefore, without the production of excessive current surges. Contacts 173 of relay 162 being closed, a current flows from source 166 over closing coil 137 of circuit breaker 136, contacts 174 and 173 and switch 167. Coil 137 is thus energized and closes circuit breaker 136. Such closure closes a circuit from battery 166 over closing coil 92 of circuit breaker 24, contacts 177, 178, 179, 181, 182, 176 and switch 167. Coil 92 thus being energized closes circuit breaker 24 which completes the connection between device 9 and line 7, 8. Circuit breaker 24 closes contacts 183, 184, 187, and 188 so that coil 92 will remain energized even if contacts 177 of relay 161 are opened. The coil of relay 161 having become deenergized upon reversal of regulator 71, contacts 177 thereof will open after a time interval determined by the time delay mechanism of relay 161. If relay 162 becomes deenergized, coil 137 will remain energized and will maintain circuit breaker 136 in closed position until circuit breaker 24 has opened.

Under the action of the flow of current through coils 80 and 153 only, regulator 71 tends to maintain the voltage in line 7, 8 at a constant value. If such voltage increases, the flow of current through windings 80 and 153 will increase and cause rotation of spindle 76 against the action of spring 75, thereby causing sector 69 to rock so that current is diverted from winding 33 towards winding 31. The armature of motor 27 is thereby made to lag and the energization of the control electrodes of device 9 is retarded, thereby decreasing the output voltage of device 9 to the desired value. If the voltage of line 7, 8 decreases, spring 75 returns spindle 76 against the action of coils 80 and 153, thereby causing the voltage of line 7, 8 to return to the desired value by a process opposite to that above outlined. Such action is modified by the action of coil 154 so that the output voltage of device 9, instead of being constant at all currents, may be made to decrease or to increase at any predetermined rate with increasing current, thereby giving to device 9 an output voltage characteristic such as curve CD in Fig. 3.

If the voltage in line 7, 8 increases because of a reduction of the load connected with such line, such voltage will reach the value OB in Fig. 3 whereupon relay 140 will close contacts 147. If the current flowing through shunt 21 further decreases to a predetermined value such as OF, regulator 71 will reach the extreme position opposite to that shown in the drawings. Contact arm 85 then closes contacts 88 and a current flows from battery 166 over contacts 88, coil of relay 159 and switch 167 so that relay 159 closes contacts 185 and 186. Current then flows from battery 166 over contacts 147 and 185, coil of relay 163 and switch 167. The armature of relay 163 is thus attracted, thereby opening contacts 169. The coil of relay 162 is thus deenergized and the armature of such relay returns to the position shown in the drawings. Relay 163 closes contacts 189 and current flows from battery 166 over contacts 186 and 189, coil of relay 163 and switch 167 so that the coil of relay 163 remains energized and the armature thereof remains attracted. Relay 163 closes contacts 193 so that resistance 145 is entirely short circuited and relay 140 is operable to close contacts 148 when the voltage is below the value OE. Relay 140 therefore immediately opens contacts 147 and closes contacts 148. Contacts 178 and 179 being opened coil 92 is deenergized and circuit breaker 24 opens. Contact 184 is thereby opened and coil 137 is deenergized so that circuit breaker 136 opens. Relay 163 having closed contacts 196, current flows from battery 166 over coils of relays 157 and 164 and over the coil 139 of circuit breaker 138, over contacts 194 and 196 and switch 167. Relay 157 attracts the armature thereof, thereby opening the short circuit across resistor 156 and short circuiting resistance 155 so that regulator 71 is operable to regulate the voltage of line 7, 8 at values represented by curve FG in Fig. 3. Relay 164 opens contact 206 and closes contact 207 so that brush 51 is connected with the positive terminal of voltage divider 39 instead of brush 49, thereby energizing control electrodes 12 at the proper times for causing operation of device 9 as a direct current inverter. The connection between device 9 and line 7, 8 being momentarily interrupted, the voltage impressed on coils 80 and 153 of regulator 71 is the output voltage of device 9 operating as a rectifier. Control electrodes 12 being now energized positively with respect to cathode 13, at times when anodes 11 receive only negative voltages from winding 128, device 9 is inoperative and coils 80 and 153 cannot receive current either from line 7, 8 or from device 9, so that regulator 71 returns to the position shown. Relay 164 having opened contacts 191 and 192 and closed contacts 203 and 204, the connections of resistance 72 are reversed and regulator 71, when in the position shown, causes the time of energization of control electrodes 12 to lag to the greatest possible extent with respect to the voltage cycle of line 6 so that, upon closure of the connections between device 9 and line 7, 8, the current flowing from line 7, 8 to be inverted in device 9 will be maintained at the smallest value possible by the adjustment of regulator 71, and the flow of such current will be established without excessive current surges. Coil 139, being energized, closes circuit breaker 138, thereby closing contacts 202 and current flows from source 166 over coil 92, contacts 186, 197, 198, 199, 201, 202 and switch 167, thereby causing circuit breaker 24 to close and complete the connection between line 7, 8 and device 9. The coil of relay 161 is momentarily energized by the closure of contacts 158, but such contacts are again opened upon movement of regulator 71 to regulate the voltage of line 7, 8 before contacts 168 and 177 have closed.

In operation, under the action of coils 80 and 153, regulator 71 will tend to maintain the voltage of line 7, 8 at a constant value. If such voltage is higher than the desired value, the action of coils 80 and 153 causes spindle 76 to rotate against the action of spring 75, thereby causing sector 69 to rock and increase the flow of current in coil 33 while decreasing the flow of current through coil 31. Such action results in advance of the time of the energization of control electrodes 12 during each cycle of the voltage of line 6, such advance, however, resulting in a decrease in the voltage of line 7, 8 because device 9 is operating as an inverter. Such action continues until the voltage of line 7, 8 returns to the desired value. If such voltage is below the desired value regulator 71 will restore such voltage to the desired value by the process opposite to that above outlined. Such action of the regulator is modified by the action of coil 154 so as to cause the voltage of line 7, 8 to either decrease or increase with increasing loads resulting in a voltage characteristic such as curve FG in Fig. 3.

During such inverting operation, if the voltage of line 7, 8 decreases below the value OE and the current flowing through device 9 decreases below the value OF, relay 140 closes contacts 148 and regulator 71 closes contacts 88, such action causing circuit breaker 24 to open, causing circuit breaker 138 to open thereafter and causing the coils of relays 157, 164 and 163 to be deenergized as may be determined by an examination of the circuits thereof. Relay 162 is then energized and circuit breakers 24 and 136 reconnect device 9 with line 7, 8 for rectifying operation as described in full detail above.

The regulation of the flow of current through device 9 may be effected manually by use of the tap of a resistance 90 which may be substituted for resistance 72 by means of a reversing switch 68 as in the embodiment in Fig. 1. It may seem that the control of a changeover between rectifying and inverting operations may be satisfactorily obtained by means of contacts 88 and 158 of regulator 71 without the addition of relay 140. Relay 140 is, however, necessary because regulator 71 reverses from one extreme position to the other during each changeover operation, and also causes changeover in response to the ratio of the input to the output voltage of the system.

In the present embodiment, upon occurrence of a disturbance of any nature causing flow of excessive current through winding 18, relay 54 opens contacts 53, thereby opening the connection of brush 49. Such action results in the interruption of the flow of current through device 9 if such device is operating as a rectifier. If such device is operating as an inverter, the flow of current must be interrupted by circuit breaker 17. In the present embodiment, contacts 58 were omitted because the closure of such contacts during inverting operation would remove, from brush 51, the positive voltage obtained from the positive portion of the voltage divider 39, thereby preventing the desired continued operation of device 9 until opening of circuit breaker 17.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electron discharge device control system, an alternating current line, an electron discharge device having anodes with associated control electrodes and a cathode, a transformer connecting said anodes with said line, a source of control potentials, means for applying said control potentials to the control electrodes to control operation of the anodes, a direct current line having one conductor connected with the cathode and another conductor connected with said transformer, means for reversing the connections of said direct current line, means for interrupting connection of said direct current line with said device and having elements controlling operation of said line connection reversing means, and means responsive to the flow of current of predetermined magnitude through said device to cause operation of said line disconnecting means.

2. In an electron discharge device control system, an alternating current line, an electron discharge device having anodes with associated control electrodes and a cathode, a transformer connecting said anodes with said line, a source of control potentials, means for applying said control potentials to the control electrodes to control operation of the anodes, a direct current line having one conductor connected with the cathode and another conductor connected with said transformer, means for reversing the connections of said direct current line, means for interrupting connection of said direct current line with said device and having elements controlling operation of said line connection reversing means, and means responsive to the flow of excessive currents through said device to maintain said control electrodes at negative potentials relative to the potential of the cathode from said source to cause cessation of the flow of current through said device.

3. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, means responsive to the flow of excessive currents through said device to maintain the control electrodes of said device at negative potentials relative to the potential of the cathode to cause cessation of the flow of current through said device, and means controlled by said line connection reversing means to control the operation of the last said means.

4. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, a synchronous motor controlling said control potential applying means, a switch connecting said synchronous motor with said alternating current line, and means delaying closure of said line disconnecting means until said motor reaches the normal speed thereof following closure of said switch.

5. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, a synchronous motor controlling said control potential applying means, energy converting means associated with said device and operable to supply direct current to said motor only after said motor becomes energized from said alternating current line.

6. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, a synchronous motor controlling said control potential applying means, excitation means for said device, and means for supplying current from said excitation means to said motor only after said motor becomes energized from said alternating current line.

7. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, a synchronous motor controlling said control potential applying means, a direct current generator driven by said motor and operable to supply direct current to said motor only after said motor becomes energized from said alternating current line.

8. In an electron discharge device control system, an alternating current line, an electron discharge device having anodes with associated control electrodes and a cathode, a transformer connecting said anodes with said line, a source of control potentials, means for applying said control potentials to the control electrodes to control operation of the anodes, a direct current line having one conductor connected with the cathode and another conductor connected with said transformer, means for reversing the connections of said direct current line, means for interrupting connections of said direct current line with said device during operation of said line connection reversing means, a synchronous motor controlling said control potential applying means, energy converting means associated with said device and operable to supply direct current to said motor, and means controlling the current supplied to said motor from said energy converting means in response to the magnitude of the current flowing through said device during rectifying and during inverting operation thereof.

9. In an electron discharge device control system, an alternating current line, an electron discharge device having anodes with associated control electrodes and a cathode, a transformer connecting said anodes with said line, a source of control potentials, means for applying said control potentials to the control electrodes to control operation of the anodes, a direct current line having one conductor connected with the cathode and another conductor connected with said transformer, means for reversing the connections of said direct current line, means for interrupting connection of said direct current line with said device during operation of said line connection reversing means, a motor controlling said control potential applying means, energy converting means associated with said device and operable to supply direct current to said motor, and means controlling the current supplied to said motor from said energy converting means in response to the magnitude of the voltage of said direct current line during rectifying and during inverting operation of such device.

10. In an electron discharge device control system, an alternating current line, an electron discharge device having anodes with associated control electrodes and a cathode, a transformer connecting said anodes with said line, a source of control potential, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, means automatically controlling the flow of current through said device, and means causing said disconnecting means to close and operable only when said current controlling means are in the condition thereof permitting the least flow of current through said device.

11. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, means controlling the flow of current through said device in response to the voltage of said direct current line, and means causing said disconnecting means to close, the last said means being operable only when said current controlling means are in the condition thereof permitting the least flow of current through said device.

12. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, a motor controlling said control potential applying means, energy converting means associated with said device and operable to supply direct current to said motor, and means controlling the current supplied to said motor from said energy converting means in response to the magnitude of the voltage of said direct current line, and means reversing the connections of said current controlling means with said motor during changeover from rectifying to inverting operation and vice versa.

13. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device during operation of said line connection reversing means, means controlling the flow of current through said device in response to the voltage of said direct current line, and means for causing said current controlling means to momentarily receive a voltage higher than the maximum voltage of said direct current line during changeover from inverting to rectifying operations.

14. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, means controlling the flow of current through said device in response to the voltage of said direct current line, and means for causing said current controlling means to momentarily receive no voltage during changeover from rectifying to inverting operations.

15. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, and means for controlling the operation of the last two said means in response to the relative potential conditions of said lines.

16. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, and means for controlling the operation of the last two said means in response to the current conditions in said direct current line.

17. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means interrupting connection of said direct current line with said device and having elements controlling operation of said line connection reversing means, and means for controlling the operation of the last two said means in response to the relative potential conditions of said lines and to the current conditions in said direct current line.

18. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having the conductor connected with said cathode and another conductor connected with said transformer, means for reversing the connections of said direct current line, means for interrupting connection of said direct current line with said device and having elements controlling operation of said line connection reversing means, and means for controlling the operation of the last two said means in response to the relative potential conditions of said lines and to the voltage conditions of said direct current line.

19. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, means automatically controlling the flow of current through said device, and means adjusting the operation of the last said means differently for rectifying and inverting operations of said device.

20. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line having one conductor connected with said cathode and another conductor connected with said transformer, means for reversing the connections of said direct current line, means for interrupting connection of said direct current line with said device and having elements controlling operation of said line connection reversing means, and means for controlling the operation of the last two said means in response to the relative potential conditions of said lines, and means for adjusting the operation of the last said means differently for rectifying and inverting operations of said device.

21. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line connectible with said cathode and with said transformer, means for connecting said direct current line with said cathode and with said transformer in one connection, means other than the second said means for connecting said direct current line with said cathode and with said transformer in an inverse connection, and means for preventing circuit closing operation of either one of the said second and third means during circuit closing operation of the other thereof.

22. In an electron discharge device control system, an alternating current line, an electron discharge device having anodes with associated control electrodes and a cathode, a transformer connecting said anodes with said line, a source of control potentials, means for applying said control potentials to the control electrodes to control operation of said anodes, a direct current line connectible with said cathode and with said transformer, means for connecting said direct current line with said cathode and with said transformer in one connection, means for connecting said direct current line with said cathode and with said transformer in an inverse connection, means for interrupting connection of said direct current line with said device, and means preventing operation of either of the second and third said means when said direct current line is connected with said device by said line disconnecting means.

CHARLES EHRENSPERGER.